(12) United States Patent
Woerndle

(10) Patent No.: US 9,055,295 B2
(45) Date of Patent: Jun. 9, 2015

(54) TRANSCODING QUEUE MANAGEMENT

(75) Inventor: Peter Woerndle, Wangen im Allgau (DE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 361 days.

(21) Appl. No.: 13/581,467

(22) PCT Filed: Feb. 27, 2010

(86) PCT No.: PCT/IB2010/000809
§ 371 (c)(1),
(2), (4) Date: Aug. 27, 2012

(87) PCT Pub. No.: WO2011/104574
PCT Pub. Date: Sep. 1, 2011

(65) Prior Publication Data
US 2012/0324085 A1    Dec. 20, 2012

(51) Int. Cl.
| | |
|---|---|
| *G06F 15/173* | (2006.01) |
| *H04N 19/40* | (2014.01) |
| *H04N 21/231* | (2011.01) |
| *H04N 21/2343* | (2011.01) |
| *H04N 21/24* | (2011.01) |
| *H04N 21/258* | (2011.01) |
| *H04N 21/2662* | (2011.01) |
| *H04N 21/426* | (2011.01) |
| *H04N 21/4782* | (2011.01) |

(52) U.S. Cl.
CPC ......... *H04N 19/40* (2014.11); *H04N 21/23109* (2013.01); *H04N 21/2343* (2013.01); *H04N 21/2408* (2013.01); *H04N 21/258* (2013.01); *H04N 21/2662* (2013.01); *H04N 21/42684* (2013.01); *H04N 21/4782* (2013.01)

(58) Field of Classification Search
USPC .......................................... 709/223–224, 246
See application file for complete search history.

(56) References Cited

U.S. PATENT DOCUMENTS

| | | |
|---|---|---|
| 6,407,680 B1 | 6/2002 | Lai |
| 2004/0031052 A1 | 2/2004 | Wannamaker |
| 2004/0117828 A1 | 6/2004 | Parker |
| 2004/0193648 A1* | 9/2004 | Lai et al. .................... 707/104.1 |
| 2006/0232448 A1 | 10/2006 | Silverman |
| 2008/0208868 A1* | 8/2008 | Hubbard ......................... 707/10 |
| 2009/0041155 A1 | 2/2009 | Sugai |
| 2010/0056076 A1* | 3/2010 | Mazzara, Jr. ................. 455/90.1 |
| 2010/0088292 A1* | 4/2010 | Tirpak et al. ................... 709/224 |
| 2010/0192201 A1* | 7/2010 | Shimoni et al. ................... 726/3 |

* cited by examiner

*Primary Examiner* — Philip B Tran
(74) *Attorney, Agent, or Firm* — Patent Portfolio Builders PLLC

(57) ABSTRACT

A network node includes a media resources server having a plurality of coded media items for processing media item requests, a statistics database for storing media item requests received by the media resources server, and a transcoding queue manager for monitoring the media requests in the statistics database and for selectively initiating coding requests to a transcoder based on the monitored media requests and for providing the coded requests to the media resources server.

20 Claims, 3 Drawing Sheets

| Time | Media | Device | Network | Count |
|------|-------|--------|---------|-------|
| T1 | K | A | X | 5 |
| T2 | L | B | Y | 3 |
| T3 | M | B | Y | 7 |
| T4 | M | A | X | 2 |

225

| Media | Device |
|-------|--------|
|       |        |
|       |        |
|       |        |
|       |        |

215

TRANSCODING QUEUE MANAGEMENT

RELATED AND PRIORITY APPLICATIONS

This application is a national stage application of International Application No. PCT/IB2010/000809 filed on 27 Feb. 2010.

TECHNICAL FIELD

This invention relates to media presentation and more particularly, to presentation of media items optimized for each requesting device.

BACKGROUND

The use of media devices has increased in an exponential manner in recent years. As a result, media has become omnipresent. Video streaming, in particular, has gained importance. Media content or items are viewed everywhere and on a vast number of different devices. Consumers demand high definition media for TVs and/or home computers. Increasingly, high quality media content is being requested for other types of devices such as mobile devices for example.

The streaming and playback capabilities vary significantly between different mobile devices (or user equipment or UE). This difference is due to one or more of computational power, licensing costs and brand strategies. A wide array of audio and video codes, container formats and resolution requirements exist. Media items are often requested separately for a specific device (e.g. video on demand or VoD) and transported via unicast.

The term "coding" generally refers to the process of coding a media which includes specifying an audio/video codec and a resolution. The output of a media item that is coded is either a stream or a file. The term "transcoded" refers to the process of taking a media item that is coded for a particular device and then "transcoding" the media item for (presentation on) another type of device.

In most cases, there exist few options for choosing the format and resolution of the media item(s) delivered to the user. Media items are coded a-priori. The choice of codec-resolution combination is performed manually for each media item which is then passed to a transcoding node.

The various streaming and playback capabilities of devices require a large number of different codec-resolution combinations of the media. Only a subset of all possible codec-resolution combinations is currently provided which attempts to support a variety of devices but not in the best possible combination for each type of the devices (such as for each particular manufacturer and each particular model for example).

A prior knowledge of devices requesting media items are not provided in most cases. Thus, it is not always possible to choose the right set of format-resolution combinations before actually delivering a media item to the device or user equipment.

In some cases, a requested media is not available. In some other cases, the media may be available but may not be rendered properly on particular requesting devices. Servers responding to user requests for media items typically do not have the capability to determine if an available media corresponding to a user request can be rendered properly on the requesting device. In these cases, the media item may be submitted even if the media item may not be rendered in an optimal manner on the requesting device.

The user experience can be frustrating and undesirable if a media item is unavailable for particular requesting user equipment or if it is only available with insufficient quality.

Common problems can be identified as: limited or no a-priori knowledge of requesting devices; bad user experience due to insufficient media quality; and bad user experience due to missing media for a requesting device.

SUMMARY

In one embodiment, a network node comprises: a media resources server having a plurality of coded media items for processing media item requests; a statistics database for storing media item requests received by the media resources server; and a transcoding queue manager for monitoring the media requests in the statistics database and for selectively initiating coding requests to a transcoder based on the monitored media requests and for providing the coded requests to the media resources server.

In another embodiment, a method of presenting media items on a user equipment comprises the steps of: submitting a media item request to a media resource database; selectively providing the requested information to the user equipment; providing media request information to a statistics database; providing media request information to a transcode queue manager at a pre-determined frequency; submitting a coding job request to a transcoder; coding a media item; submitting the coded media item to the transcoder; and submitting the coded media item to the media resource database.

BRIEF DESCRIPTION OF THE DRAWINGS

The several features, objects, and advantages of Applicant's invention will be understood by reading this description in conjunction with the drawings, in which.

DETAILED DESCRIPTION

The following description of the implementations consistent with the present invention refers to the accompanying drawings. The same reference numbers in different drawings identify the same or similar elements. The following detailed description does not limit the invention. Instead, the scope of the invention is defined by the appended claims.

According to exemplary embodiments, a system for presenting media items is disclosed. The media presentation may be optimized for the user equipment on which the media is presented.

Data on media requests may be collected to determine a suitable set of transcoding formats and resolutions. Statistics may be gathered on the media items being requested as well as on the device requesting the media items. Transcoding may be performed based on these statistics to generate codec-resolution combinations. The resolution combinations can be used to provide an optimal media presentation to the requesting devices.

Figure 2:
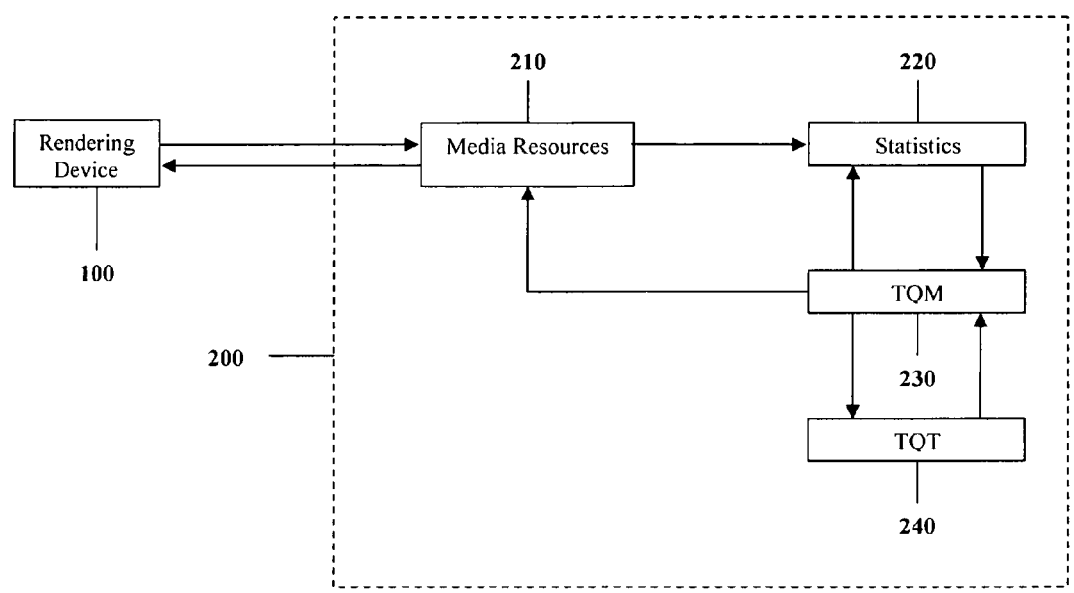
FIG. 2 illustrates a system according to exemplary embodiments.

A system for facilitating exemplary embodiments is illustrated in FIG. 2. A user device or user equipment 100 may access a media server 200 for accessing media items. Media server may include a media resources module 210, a statistics module 220, a transcoding queue manager (TQM) 230 and transcoding queue and transcoder (TQT) module 240.

The media resources module 210, statistics database 220, TQM 230 and TQT 240 may be functional nodes in one location in a network or can all be at different locations in a network (i.e. they could all be at one network node or each of them can be different nodes in a network).

User or requesting device 100 can, in general, be any device that is capable of rendering media. This may include, but is not limited to, a personal computer, a set top box, a netbook, a Play Station®, a mobile phone, a personal digital assistant, gaming console, etc. These devices are well known and are not described herein further. User device can be connected to a network via a communication interface 110 which can be a wireless or a wired connection, User device 100 can include a memory 120 for storing media. In some embodiments, media items may be rendered in real-time (e.g. video or audio stream) in which case the media items need not be stored. Users can interact with device 100 via one or more input devices 130 such as a keyboard, a mouse, a scrolling pad/surface, a joystick, etc. Users can also interact with device 100 via a remote control 135. The media may be rendered on a display/screen 140 (e.g. video) and/or streamed over speakers 150 (i.e. audio). The display and speakers can be attached externally to the device or integrated within.

Media resources module 210 may be a database or a file streaming server which has media items stored therein. In some embodiments, media resources module 210 can be a portal with links to media items in which case, there may not be a need for storing media items.

The statistics module 220 may also be a database which stores requests from user equipment or user devices 100. TQM 230 may determine whether (and which) media items need to be transcoded and for generating transcoding jobs for TQT 240. TQM 230 may determine the type of transcoding needed based on the requesting device capabilities. TQM 230 may, in some embodiments, provide an identity of the requesting device to TQT 240 for which a requested media item is to be transcoded. TQT 240 may transcode the media for the requesting device identified by TQM 230. System 200 may include more than one TQT 240.

Device 100 requests a media item from media resources module 210. The requested media item and the requesting device identity may be included in the request. The request may be made by accessing a website that provides links to media items or files. Device 100 may be identified by its "User-Agent" string of the browser which is a header field in the HTTP protocol.

The requested media item and requesting device identification may be provided to the statistics database 220 with each request. The identification information may be stored in database 220. The information may be stored regardless of whether the requested item is delivered. The statistics database may be updated with each request.

Figures 1, 3, 4:
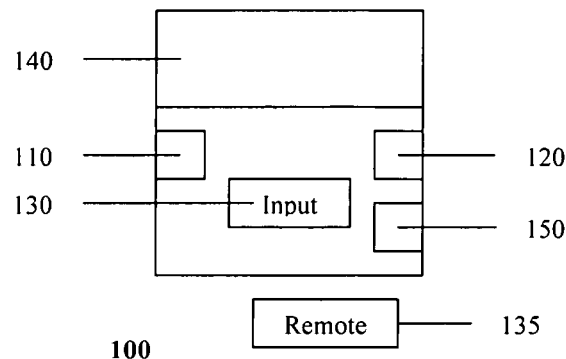
FIG. 1 illustrates a media rendering device.
FIGS. 3 and 4 exemplary storage tables within exemplary modules.

Database 220 may include a table 225 (FIG. 3). Table 225 may include fields or entries for, among other things, a media item that is requested, the requesting device, the time at which a request for a particular media item is made and the number of times (i.e. a count) a media item is requested. The requesting information may also include information about the network from which the media is requested by a user in some embodiments.

TQM 230 may submit a query to statistics database 220 at a predetermined frequency in order to obtain particular information from the requesting information stored in database 220. The frequency of queries may depend on the particular environment in which exemplary embodiments are implemented. It could be seconds, minutes, hours or even longer. It may be a function of the hardware capabilities that are available.

The query from TQM 230 may request information about one or more media items and corresponding requesting devices for which the count value is greater than a predetermined threshold. An exemplary query of this type may have the general form: which media item has been requested five or more times and what is/are the corresponding requesting device(s)? The number of times that is specified in the query may be a pre-determined value threshold.

In some embodiments, TQM 230 may request information on how often a particular media item has been requested over a predetermined period of time and the requesting device identity. An exemplary query of this type may have the general form: how many times has media item M been requested over the last 20 minutes and what is/are the corresponding requesting media device(s)? The number of times and the preceding time period specified in the query may each be a pre-determined value threshold.

In response to these types of queries from TQM 230, statistics database 220 may provide the requested (relevant) information. The statistics may also be maintained for other purposes by statistics database 220.

TQM 230 may maintain a log of queries submitted (including time of a query for example) so that responses to subsequent queries may be distinguished from responses to earlier queries in order to ensure accuracy of the responses. For similar purposes, statistics database 220 may maintain a log of queries received. Table 225 may also include flags to maintain query and response history.

TQM 230 may generate a transcoding job request and submit it to an (appropriate) transcoder (such as TQT 240 for example). The transcoding job request may specify the requested media item and the requesting device. The transcoding parameters may be determined by TQT 240 from, for example, the wireless universal resource file (WURFL), the user agent profile (UAProf) and the delivery context ontology (DCO).

TQT 240 (or some other transcoder) may execute the transcoding job and submit the (transcoded) media item (or link to the coded media item) back to TQM 230. TQM 230 may then forward the media item to the media resources module 210 (or the link) which may then be made available for the next appropriate requesting user. The term "appropriate" in this context refers to the requesting device for which the newly added transcoded media item is suitable.

A table 215 (FIG. 4) may also be included in media resources module 210 that includes entries for media item identities and the devices for which each of the media items have been transcoded (or links).

Figure 5:
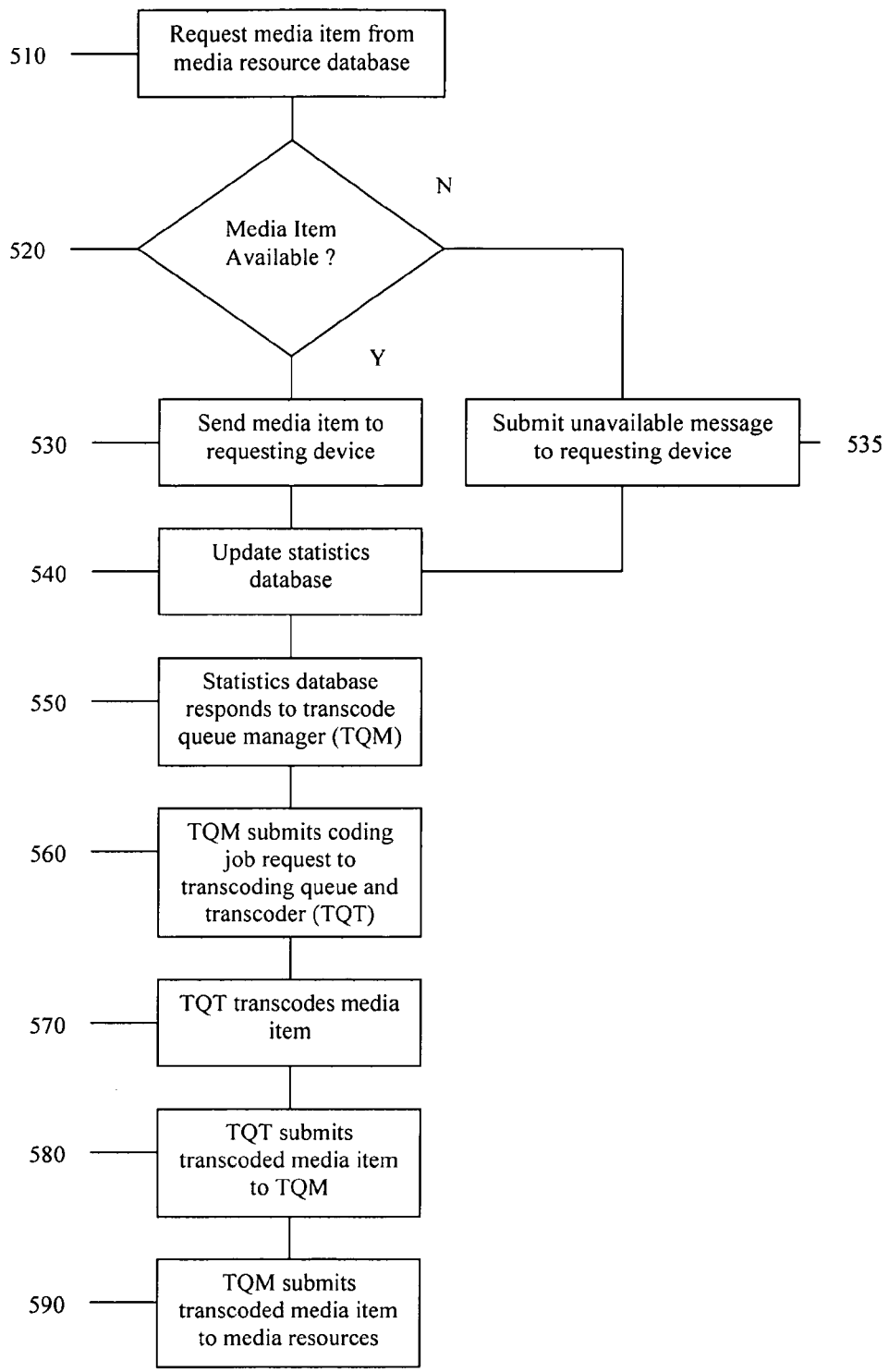
FIG. 5 illustrates a method according to exemplary embodiments.

A method in accordance with exemplary embodiments for providing appropriately coded media items to a user device is illustrated in FIG. 5. A user may request a media item at 510. The request may include an identity of the media item that is requested as well as the identity of the requesting device and in some embodiments, the network identity. The request may be processed by a media resource module to determine if the media item exists or is available at 520. If the media item is available, it may be provided to the requesting device at 530. The identity information from the user request may be submitted to a statistics database at 540.

If the item is not available, a message may be submitted to the requesting device that the requested media item is not available at 535. The identity information from the user request may be submitted to the statistics database at 540.

The statistics database may respond to a periodic query from a transcoding queue manager (TQM) at 550. The query may specify the information requested by TQM as described above with reference to FIG. 2. The response to the query may include identity of media item(s) and associated requesting device(s) satisfying the query.

TQM may submit a transcoding job request to a transcoding queue and transcoder (TQT) module at 560. The job request may specify the media item that is to be transcoded and the identity of the requesting device.

In some embodiments, prior to submitting this request, TQM may determine whether a requested media item is (already) available for the requesting device or if coding or transcoding is currently taking place for the requested media item.

TQT may transcode the media item at 570 and submit it (or a link where the transcoded media item is available) to TQM at 580. TQM may then submit the media item (or a link) to media resources module at 590. Links to locations where the (transcoded) media items may be found can be submitted in place of submitting the media items.

In some embodiments, media items from table 215 may be removed if they are not requested with a predetermined frequency or have not been requested within a pre-determined preceding time period (e.g. they are not popular). This may be to preserve storage resources for example.

Certain advantages may be realized via implementation of exemplary embodiments as highlighted. These include, but are not limited to, increasing a user experience by generating media items best suitable for playback or rendering devices.

Exemplary embodiments also avoid the issue of missing media items for specific devices by generating suitable media files during the media's lifetime. The lack of a-priori knowledge about requesting devices is compensated by a flexible transcoding process during the lifetime of the media.

A media item may not be available or may be rendered in sub-optimal manner due to limitations of the rendering device. Embodiments as described above overcome these limitations: if a media item is unavailable or only available with poor quality for the requesting device, it (i.e. the requested media item) may be transcoded by monitoring a demand (or frequency indicating its popularity) for it.

While the description has highlighted video streaming, exemplary embodiments may be equally applicable to other digital media items such as digital music, etc. It may be applicable wherever (requesting) device capabilities or limitations prevent optimal rendering of the requested media item. The limitations may also result from network capability such as inadequate bandwidth, etc.

It will be appreciated that the procedures described above may be carried out repetitively as necessary. To facilitate understanding, many aspects of the invention are described in terms of sequences of actions. It will be recognized that the various actions could be performed by a combination of specialized circuits and software programming.

Thus, the invention may be embodied in many different forms, not all of which are described above, and all such forms are contemplated to be within the scope of the invention. It is emphasized that the terms "comprises" and "comprising", when used in this application, specify the presence of stated features, steps, or components and do not preclude the presence or addition of one or more other features, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A network node, comprising:
    a media resources server having a plurality of coded media items for processing media item requests;
    a statistics database for storing media item requests received by the media resources server; and
    a transcoding queue manager for monitoring the media requests in the statistics database and for selectively initiating new coding requests to a transcoder based on a number of requests for the monitored media over a given period of time that defines a frequency of requests indicating a popularity of the monitored media that satisfies a pre-determined threshold value and for providing the newly coded requests to the media resources server.

2. The network node of claim 1, wherein a media item request includes an identity of the media item and an identity of a requesting device.

3. The network node of claim 2, wherein the media request item further includes an identity of the network from which the request is received.

4. The network node of claim 1, wherein the statistics database includes a table for maintaining a count of a number of requests for a plurality of media items from at least one requesting device.

5. The network node of claim 4, wherein the transcoding queue manager queries the statistics database at a pre-determined frequency to provide identities of a requested media item and of a requesting device for which the count is at least a pre-determined threshold value.

6. The network node of claim 5, wherein the transcoding queue manager initiates a coding job request to the transcoder for media items returned by the statistics database based on a response to the query.

7. The network node of claim 6, wherein the coding job request specifies the requesting device.

8. The network node of claim 6, wherein the transcoder codes the media items and submits the coded media items to the transcoding queue manager.

9. The network node of claim 8, wherein the transcoding queue manager submits the coded media items to the media resources server.

10. The network node of claim 1, further comprising: a plurality of transcoders.

11. A method of presenting media items on a device comprising:
    submitting a media item request to a media resource database;
    selectively providing the requested media item to the user equipment based on availability of the requested media item;
    providing the media request information to a statistics database for storing the requested media item;
    providing media request information from the statistics database to a transcode queue manager;
    submitting a new coding job request to a transcoder for media items having a frequency of requests indicating a popularity of the media items that satisfies a pre-determined threshold value;
    coding the media item;
    submitting the newly coded media item to the transcode queue manager; and
    submitting the newly coded media item to the media resource database.

12. The method of claim 11, wherein the media item request includes an identity of the requested media item and of the requesting user equipment.

13. The method of claim 12, further comprising:
incrementing a count for the requested media item and requesting user equipment in the statistics database with each request.

14. The method of claim 12, further comprising:
providing information by the statistics database in response to a query from the transcode queue manager.

15. The method of claim 14, further comprising:
issuing the query at a pre-determined frequency.

16. The method of claim 14, wherein the query specifies an identity of a requested media item and of a requesting device satisfying a pre-determined threshold value.

17. The method of claim 16, wherein the query requests identity of a requested media item and requesting device having a count value satisfying a pre-determined threshold value over a pre-determined preceding period of time.

18. The method of claim 11, further wherein the coding job request specifies the requesting media device.

19. The method of claim 11, wherein the media item request further includes an identity of a network requesting the media item.

20. The method of claim 11, wherein a link to the coded media item is submitted to the transcode queue manager and the link is submitted to the media resource database.

* * * * *